United States Patent [19]
Leedahl et al.

[11] 3,897,832
[45] Aug. 5, 1975

[54] AGRICULTURAL TOOL BAR

[75] Inventors: Alton O. Leedahl, Cedar Falls; Thomas K. Wilhelm; John L. Krizek, both of Waterloo, all of Iowa

[73] Assignee: Dunham Lehr, Inc., Richmond, Ind.

[22] Filed: Aug. 19, 1974

[21] Appl. No.: 498,256

[52] U.S. Cl. ............... 172/311; 172/328; 56/228; 56/6; 280/414.5; 172/776
[51] Int. Cl. ............... A01b 49/00; A01b 73/00; A01b 59/044
[58] Field of Search .......... 172/311, 328, 240, 397, 172/414, 323; 280/414.5; 172/776

[56] References Cited
UNITED STATES PATENTS

| | | | |
|---|---|---|---|
| 3,414,064 | 12/1968 | Foster | 172/311 |
| 3,460,631 | 8/1969 | Friesen et al. | 172/311 |
| 3,628,613 | 12/1971 | Kaufman | 172/311 |
| 3,637,027 | 1/1972 | Kovar | 172/311 |
| 3,669,195 | 6/1972 | Green et al. | 172/311 |
| 3,700,040 | 10/1972 | Sosalla et al. | 172/311 |

*Primary Examiner*—George J. Marlo
*Attorney, Agent, or Firm*—Zarley, McKee, Thomte & Voorhees

[57] ABSTRACT

An agricultural tool bar comprising a wheeled center frame having a first wing frame pivotally connected about a horizontal axis to one end thereof and a second wing frame pivotally connected about a horizontal axis to the other end thereof. The center frame comprises a pair of longitudinally extending and spaced apart frame members having rearward and forward ends. A tongue tube is rotatably secured to the first and second frame members at the forward ends thereof and has a forwardly extending tongue secured thereto for connection to the prime mover such as a tractor or the like. An axle tube is rotatably secured to the rearward ends of the first and second frame members and has rearwardly extending wheel arms secured thereto adjacent the outer ends thereof. A transport wheel is rotatably secured to each of the wheel arms. A bell-crank means is rotatably mounted on the center frame and comprises an actuator plate having opposite ends which are pivotally connected to actuator arms extending therefrom. The outer ends of the actuator arms are operatively connected to the wing frames by means of a "float" connector so that rotation of the actuator plate will cause the wing frames to pivot relatively to the center frame. A length adjustable link arm is operatively pivotally secured at its rearward end to the actuator plate and is pivotally secured at its forward end to the tongue tube so that rotation of the actuator plate causes the tongue tube to rotate relatively to the center frame to raise or lower the forward end of the center frame. A link arm also pivotally connects the actuator plate with the axle tube so that rotation of the actuator plate causes the axle tube to rotate relative to the center frame to raise or lower the same. A hydraulic cylinder means is connected to the actuator plate for selectively rotating the actuator plate. The relationship of the tongue tube, axle tube, bell-crank apparatus and float connectors is such that the center frame means is initially raised relatively to the ground with the wing frames then being raised and pivoted upwardly to a transport position.

11 Claims, 13 Drawing Figures

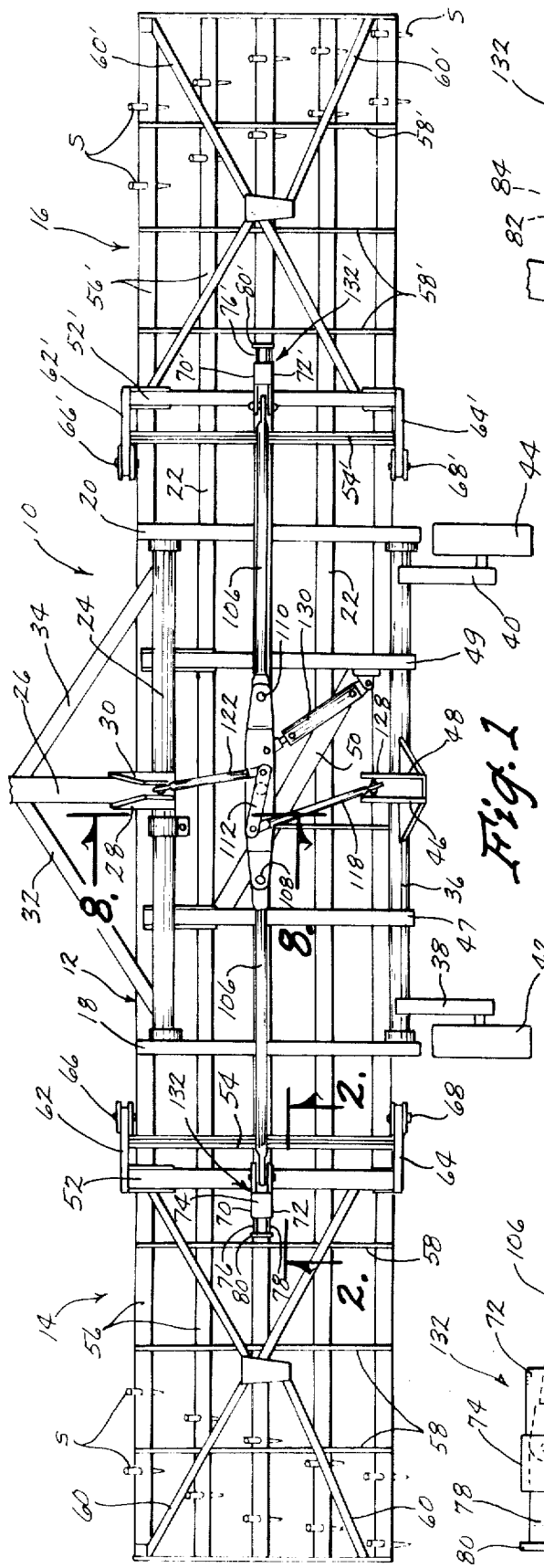

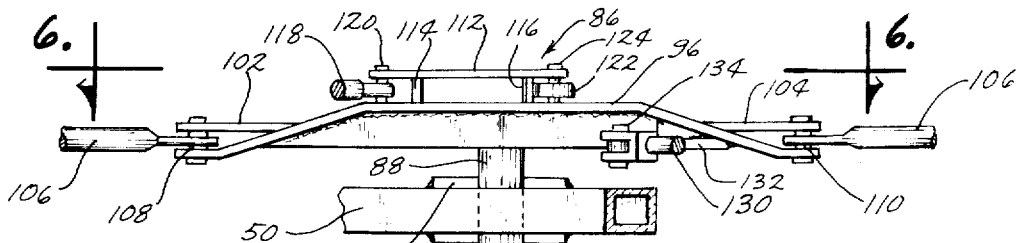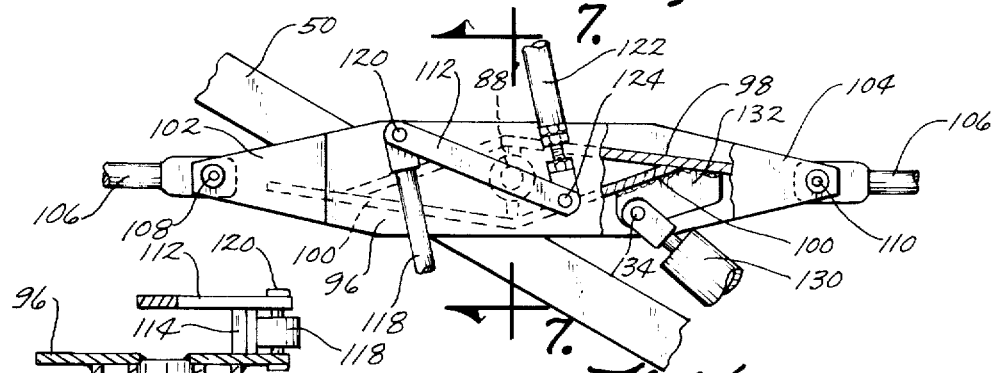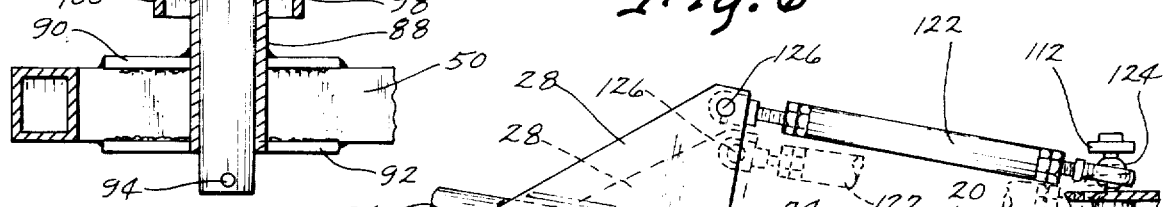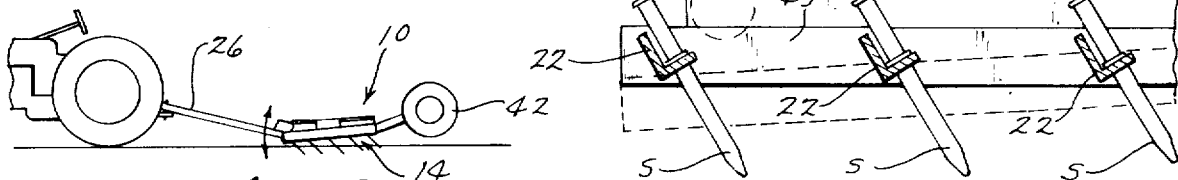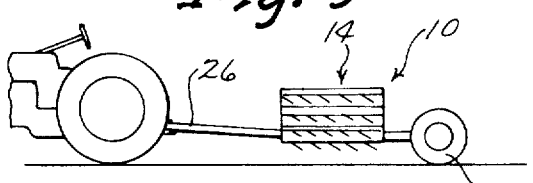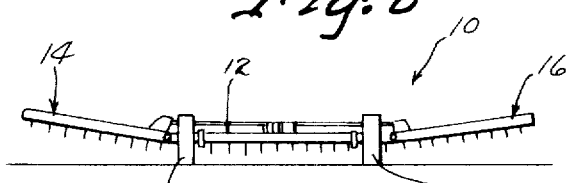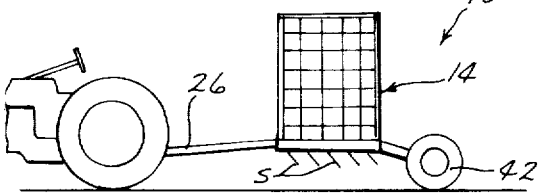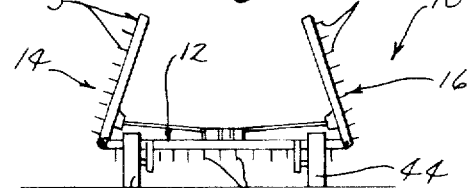

AGRICULTURAL TOOL BAR

BACKGROUND OF THE INVENTION

This invention relates to an agricultural tool bar and more particularly to an agricultural tool bar wherein a bell-crank apparatus is employed to vary the pitch of the machine, lift the machine out of the soil and fold the machine so it can be transported on the road.

Various agricultural tool bars have been previously provided wherein the wing frames can be moved to a transport position. However, conventional tool bars require several hydraulic cylinders to cause the folding or collasping of the same and also require several independent operations to complete the movement of the tool bar from its transport to operating position and vice versa.

The conventional tool bars also leave something to be desired since the pitch of the machine cannot be varied or controlled from the tractor seat. Further, the conventional devices are not convenient to operate and sometimes suffer structural damage due to the design thereof.

Therefore, it is a principal object of the invention to provide an improved agricultural tool bar.

A further object of the invention is to provide an agricultural tool bar including a bell-crank apparatus for raising the soil conditioning equipment out of ground engagement in a quick and efficient manner.

A further object of the invention is to provide an improved agricultural tool bar wherein the pitch of the machine can be varied from the tractor seat.

A further object of the invention is to provide a tool bar wherein the wing frames are lifted at the same time that the machine itself is lifted.

A further object of the invention is to provide an agricultural tool bar wherein the wing frames are rotated upwardly simultaneously at the same rate.

A still further object of the invention is to provide an agricultural tool bar wherein a single hydraulic cylinder may be used to accomplish all of the desired results.

A further object of the invention is to provide an agricultural tool bar employing a bell-crank means designed so that a large majority of the forces on the bell-crank cancel each other when the machine is working in the field and when it is in the transport position.

A further object of the invention is to provide an agricultural tool bar wherein a majority of the rotation of the wing frames occurs after the machine itself has been raised to nearly its maximum height.

A further object of the invention is to provide an agricultural tool bar which is economical of manufacture and durable in use.

These and other objects will be apparent to those skilled in the art.

BRIEF DESCRIPTION OF THE DRAWINGS

FIG. 1 is a top view of the apparatus of this invention:

FIG. 2 is an enlarged sectional view seen on lines 2 — 2 of FIG. 1:

FIG. 3 is a partial top view similar to FIG. 1 except that the wing frames have been pivotally moved upwardly to their vertical position:

FIG. 4 is an enlarged sectional view seen on lines 4 — 4 of FIG. 3:

FIG. 5 is a side view of the bell-crank apparatus with portions thereof cut-away to more fully illustrate the invention:

FIG. 6 is a view of the bell-crank mechanism as seen on lines 6 — 6 of FIG. 5:

FIG. 7 is an enlarged sectional view seen on lines 7 — 7 of FIG. 6:

FIG. 8 is an enlarged sectional view seen on lines 8 — 8 of FIG. 1 with the broken lines indicating the position to which the machine may be lowered:

FIG. 9 is a side schematic view illustrating the tool bar in its working or field position:

FIG. 10 is a view similar to FIG. 9 but which illustrates the earth working tools being raised out of ground engagement;

FIG. 11 is a rear view of the machine in the position of FIG. 10:

FIG. 12 is a view similar to FIGS. 9 and 10 except that the wing frames have been pivotally moved to their vertical position; and FIG. 13 is a rear view illustrating the machine in the position of FIG. 12.

SUMMARY OF THE INVENTION

An agricultural tool bar comprising a center frame having wing frames pivotally connected about a horizontal axis to the opposite ends thereof. A tongue tube is rotatably secured to the center frame at the forward end thereof and has a tongue extending therefrom for connection to the tractor. An axle tube is rotatably mounted on the rearward end of the center frame and has a pair of transport wheels rotatably mounted thereon. A bell-crank apparatus is rotatably mounted on the center frame and is operatively connected to the wing frames, tongue tube and axle tube. A hydraulic cylinder is pivotally connected to the bell-crank apparatus so that actuation of the cylinder causes the center frame to be raised relative to the ground and so that the wing frames are pivotally moved upwardly to transport positions and vice-versa. The wing frames are connected to the bell-crank apparatus by means of a float connection. The relationship of the tongue tube, axle tube, bell apparatus and float connectors, is such that the center frame is initially raised relative to the ground with the wing frames then being raised and pivoted upwardly to a transport position.

Description of the Preferred Embodiment

The numeral 10 refers to the tool bar of this invention generally comprising a wheeled center frame 12 and wing frames 14 and 16. Center frame 12 includes longitudinally extending frame members 18 and 20 having a plurality of spaced apart, transversely extending tool supports 22 welded to the underside thereof. The numeral 24 refers to a tongue or pole tube which is rotatably mounted on the forward ends of frame members 18 and 20 and extends therebetween. The rearward end of tongue 26 is secured to tube 24 and has a pair of upstanding plates 28 and 30 secured thereto as seen in FIG. 1. A pair of tongue braces 32 and 34 are secured to and extend between tongue 26 and tube 24 as also illustrated in FIG. 1.

The opposite ends of axle tube 36 are rotatably mounted on the rearward ends of frame members 18 and 20. Wheel arms 38 and 40 extend rearwardly from the opposite ends of axle tube 36 and have transport wheels 42 and 44 rotatably mounted thereon respectively. A pair of upstanding plates 46 and 48 are welded to tube 36 at the center thereof.

A pair of spaced apart, transversely extending frame members 47 and 49 have their forward and rearward ends rotatably secured to tubes 24 and 36 respectively. Tubular brace 50 is secured to frame members 47 and 49 and extends diagonally therebetween (FIG. 1).

Wing frame 14 includes a longitudinally extending frame member 52 which is positioned outwardly of the inner end 54 thereof. A plurality of transversely extending tool supports 56 are secured to the frame member 52 and extend to the outer end of wing frame 14. Spaced apart braces 58 are secured to and extend between the supports 56. Wing frame 14 is also provided with braces 60 as seen in the drawings. Bars 62 and 64 are secured to the forward and rearward ends of frame member 52 respectively and extend inwardly therefrom for pivotal connection to center frame 12 at 66 and 68 respectively.

Plates 70 and 72 are welded to frame member 52 and extend upwardly therefrom. Tube 74 is provided at the upper end of plates 70 and 72 and is adapted to slidably receive a pair of bars 76 and 78 having a plate 80 welded to the outer ends thereof. As seen in the drawings, plate 80 is adapted to engage the outer end of tube 74 to limit the inward movement of bars 76 and 78 with respect to tube 74. A float adjustment bolt 82 extends between the lower end of plate 80 and a plate 84 extending downwardly from tube 74.

The numeral 86 refers to a bell-crank apparatus or mechanism provided on center frame 12. An upstanding collar 88 is secured to brace 50 by webs 90 and 92 (FIG. 7) and has a shaft stub 94 rotatably mounted therein. Actuator plate 96 is welded at its center length to the upper end of shaft 94 and extends laterally therefrom. Webs 98 and 100 are secured to the underside of plate 96 (FIG. 6) for providing additional strength and rigidity to the device.

As seen in FIG. 5, the outer ends of plate 96 dwell in a plane below the center thereof and have ears 102 and 104 secured thereto respectively. The numeral 106 refers to an actuator rod which is connected to plate 96 and ear 102 by a spherical bearing connector 108 while the numeral 106' refers to an actuator rod which is connected to plate 96 and ear 104 by spherical bearing connector 110.

Bar 112 is positioned above the center area of plate 96 and is secured thereto by post elements 114 and 116. Link arm 118 is pivotally connected at its forward end to one end of bar 112 at 120. A length adjustable link arm 122 is pivotally connected to the other end of link arm 112 by means of a spherical bearing connector 124. The forward end of link arm 122 is pivotally connected to plates 28 and 30 by pin 126. The rearward end of link arm 118 is pivotally connected to plates 46 and 48 on tube 36 by means of spherical bearing connector 128. Hydraulic cylinder 130 is pivotally connected at its base end to frame member 49 and is pivotally connected at its rod end to a web 132 at 134 which is secured to the actuator plate 96 as seen in FIG. 6. The hydraulic cylinder 130 is connected to the tractor hydraulic system in conventional fashion and is controlled from the operator's seat. Spherical connectors and bearing of the type 124 and 128 are used throughout the link connections of the aforementioned structure.

Wing frame 16 includes a longitudinally extending frame member 52' which is positioned outwardly of the inner end 54' thereof. A plurality of transversely extending tool supports 56' are secured to the frame member 52' and extend to the outer end of wing frame 16. Spaced apart braces 58' are secured to and extend between the supports 56'. Wing frame 16 is also provided with braces 60'. Bars 62' and 64' are secured to the forward and rearward ends of frame member 52' respectively and extend inwardly therefrom for pivotal connection to center frame 12 at 66' and 68' respectively. Plates 70' and 72' are welded to frame member 52' and extend upwardly therefrom. Tube 74' is provided at the upper end of plates 70' and 72' and is adapted to slidably receive a pair of bars 76' and 78' having a plate 80' welded to the outer ends thereof. As seen in the drawings, plate 80' is adapted to engage the outer end of tube 74' to limit the inward movement of bars 76' and 78' with respect to tube 74'. A float adjustment bolt 82' (not shown) extends between the lower end of plate 80' and a plate 84' extending downwardly from tube 74. The outer end of actuator rod 106' is pivotally connected to the bars 76' and 78'. For purposes of this discussion, the agricultural tool bar will be described as comprising a spike tooth harrow having a plurality of spikes S extending downwardly from the tool supports 56, 22 and 56'.

The normal method of operation is as follows. Assuming that the harrow is in the position of FIGS. 1 and 9, the pitch of the machine can be controlled from the operator's seat by simply causing the hydraulic cylinder 130 to be actuated which causes the tongue or pole tube 24 to be rotated relative to frame members 18 and 20 which effectively raises or lowers the rearward end of the tongue 26 as illustrated in FIG. 9. Ordinarily, the transport wheels 42 and 44 are out of ground engagement while the harrow is being used in field operations as illustrated in FIG. 9. The float connectors 132 and 132' permit the wing frames 14 and 16 to float to conform to the contour of the ground. The float connectors 132 and 132' permit the wing frames to float but prevent objectionable dropping of the wing frames due to the fact that the plates 80 and 80' engage the outer ends of the tubes 74 and 74' respectively to limit the pivotal movement of the wing frames 14 and 16 relative to center frame 12. The float adjustment bolts 82 and 82' also permit the amount of float to be adjusted. The fact that the float connectors are provided between the center frame and the wing frames permit the floating of the wing frames which is not possible if hydraulic cylinders were directly connected to the wing frames to control the pivotal movement thereof.

When it is desired to move the tool bar into a transport position, it is simply necessary to actuate hydraulic cylinder 130 so that the rod thereof is extended therefrom to rotate actuator plate 96 in a counter-clockwise direction as viewed in FIGS. 1 and 3. Extension of the cylinder rod from the cylinder 130 causes the rotation of tongue tube 24 and axle tube 36 which causes the forward end of the center frame 12 to be pivotally moved upwardly and which causes the transport wheels 42 and 44 to be moved into ground engagement so that the rearward end of the center frame is also moved relative to the ground. The wing frames 14 and 16 are also pivotally moved upwardly from the position of FIG. 9 to the positions of FIGS. 10 and 12 as the center frame is raised. The float connectors between the center frame and the wing frames in conjunction with the previously described action of the bell crank results in the majority of the rotation of the wing frames occurring after the center frame has been raised to nearly its maximum height. The wing frames 14 and 16 pivotally move upwardly to the position of FIGS. 12 and 13 at the same rate. The tool bar may be moved from its transport position to its field position by simply actuating the hydraulic cylinder 130 to cause the cylinder rod thereof to be retracted into the cylinder which causes the actuator plate 96 to rotate in a clockwise direction as viewed in FIGS. 1 and 3.

Thus it can be seen that a novel agricultural tool bar has been provided wherein a single hydraulic cylinder is employed to provide all of the necessary functions required of a tool bar. The bell-crank apparatus is designed so that most of the forces on the bell-crank cancel each other out when the machine is working in the field and when it is in its transport position. Thus it can be seen that the tool bar accomplishes at least all of its stated objectives.

We claim:
1. An agricultural tool bar comprising,
a center frame having rearward and forward portions and opposite side portions, a tongue means secured to said center frame and extending forwardly therefrom for connection to a prime mover,
an axle tube rotatably mounted on said center frame,
a wheel means operatively secured to said axle tube adapted to be selectively moved into and out of ground engagement upon rotation of said axle tube,
first and second wing frames pivotally secured to the opposite side portions of said center frame,
a bell-crank apparatus rotatably mounted on said center frame,
first connection means pivotally connecting said bell-crank apparatus and said axle tube whereby rotation of said bell-crank apparatus causes said axle tube to be rotated,
second and third connection means pivotally connecting said bell-crank apparatus and said wing frames whereby rotation of said bell-crank apparatus causes said wing frames to be pivoted relatively to said center frame,
and a power means connected to said bell-crank apparatus so that actuation of said power means causes said center frame to be moved relatively to the ground and also causes said wing frames to pivot relatively to said center frame.

2. The tool bar of claim 1 wherein a tongue tube means is rotatably mounted on said center frame at the forward portion thereof, said tongue means being rigidly secured to said tongue tube means, and fourth connection means pivotally connecting said bell-crank apparatus and said tongue tube means so that rotation of said bell-crank apparatus causes the forward portion of said center frame to be moved relatively to the ground.

3. The tool bar of claim 1 wherein each of said second and third connection means comprises a float connection means.

4. The tool bar of claim 3 wherein said float connection means comprises means for permitting a predetermined amount of pivotal movement of said wing frames relatively to said center frame so that said wing frames may follow the contour of the ground.

5. The tool bar of claim 4 wherein said float connection means comprises a tubular support means mounted on the wing frame, a support member slidably mounted in said tubular support means in a direction transverse to the direction of travel, said support member having an outer end adapted to engage said tubular support means to limit the inward slidable movement of said support member in said support means, one of said second and third connection means pivotally connecting said bell-crank apparatus and said support member.

6. The tool bar of claim 5 wherein a float adjustment means is secured to and extends between said support member and support means for selectively adjusting said predetermined amount of pivotal movement.

7. The tool bar of claim 1 wherein said bell-crank apparatus comprises an elongated actuator plate means rotatably mounted on said inner frame about a vertical axis and having first and second ends, said second and third connection means being secured to said first and second ends of said actuator plate means respectively.

8. The tool bar of claim 7 wherein said power means is movably secured to and extends between said center frame and said actuator plate means between the axis of rotation and one end thereof.

9. The tool bar of claim 8 wherein a second plate means is mounted on said actuator plate means and spaced with respect thereto, said second plate means having first and second ends, said second plate means being positioned a greater distance from the axis of rotation of said actuator plate means than is said second end of said second plate means, said first connecting means being pivotally connected to said first end of said second plate means.

10. The tool bar of claim 8 wherein a tongue tube means is rotatably mounted on said center frame at the forward end thereof, said tongue means being rigidly secured to said tongue tube means, and fourth connection means pivotally connecting said second end of said second plate means and said tongue tube means so that rotation of said actuator plate means causes the forward end of said center frame to be moved relatively to the ground.

11. The tool bar of claim 8 wherein said fourth connection means comprises a length adjustable arm.

* * * * *